July 30, 1940.    W. B. WAIT    2,209,670
SPEED AND CUTOFF INDICATOR FOR LOCOMOTIVES
Filed July 19, 1938
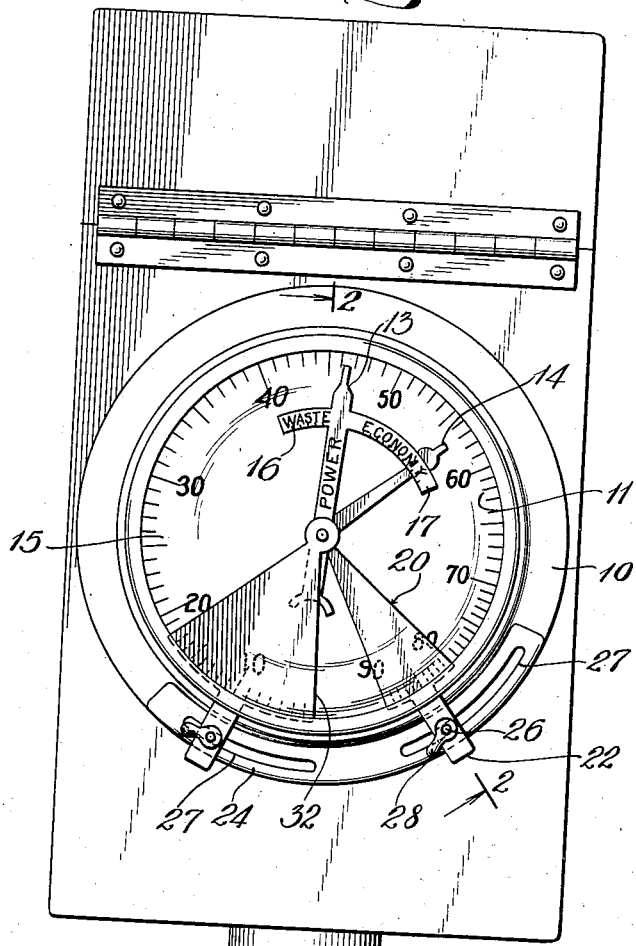
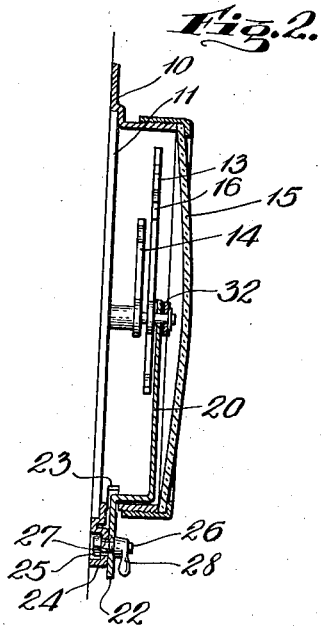
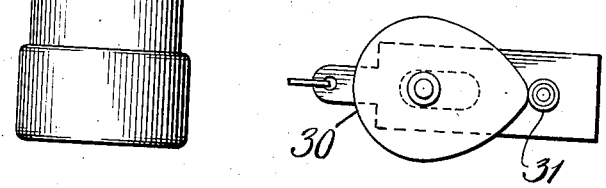
INVENTOR
WILLIAM BELL WAIT
BY
ATTORNEY Patented July 30, 1940

2,209,670

UNITED STATES PATENT OFFICE 2,209,670

SPEED AND CUTOFF INDICATOR FOR LOCOMOTIVES

William Bell Wait, New York, N. Y.

Application July 19, 1938, Serial No. 219,962

4 Claims. (Cl. 116—129)

The present invention relates to improvements in speed and cutoff indicators for locomotives. Such indicators are usually provided with a hand which moves over a dial to show the instant speed of the locomotive and also with another hand which shows the instant setting of the cutoff in terms of speed. The hands are so correlated for each speed, that when the cutoff hand points to the same speed as the speed hand, the cutoff is set to give maximum tractive effort at that speed. If the cutoff hand is on one side of the speed hand, it indicates waste of fuel. When it is on the other side, it indicates economy of fuel.

It has been found that when starting an engine the cutoff should be in full stroke position until the locomotive has reached a certain speed which varies with different characteristics of design of locomotives. For example in certain types of freight locomotives the reverse lever should be left in full stroke position, that is, the cutoff should remain in the most retarded position until a speed of eight miles has been reached, while in the case of certain types of passenger locomotives the cutoff should remain in the most retarded position until a speed of eighteen miles an hour has been attained. Heretofore the mechanism for controlling the position of the cutoff indicator was so constructed that when the cutoff was in the most retarded position, the cutoff indicator stood at the miles per hour indicating the speed at which the engineer should begin to shorten the cutoff. On the freight locomotive referred to, the cutoff indicator would stand at eight miles per hour and in case of the passenger locomotive referred to at eighteen miles per hour. Instructions were given to the engineer to wait until the speed hand had caught up with the cutoff hand before he began to hook up so as to shorten the cutoff.

One of the objects of my invention is to construct the mechanism which sets the cutoff indicator in terms of speed so that the cutoff hand will stand at the bottom of the speed range or at least below the minimum speed at which the engineman should begin to shorten the cutoff on any type of locomotive.

Another object of the invention is to provide indicating means preferably, though not necessarily, made adjustable, which will indicate to the engineer the speed which the locomotive should attain before and at which he should begin to hook up, that is shorten the cutoff.

It has also been found that there is a limit to which the cutoff may be shortened when working the locomotive at high speeds and that this limit varies with different types of locomotives. It is, therefore, also an object of my invention to provide an adjustable means indicating a point beyond which the cutoff should never be advanced when working the locomotive.

Other objects of the invention will appear from the following description taken in connection with the drawing, in which—

Fig. 1 is a front view of an indicator showing my invention applied thereto;

Fig. 2 is a vertical sectional view on line 2—2 of Fig. 1; and

Fig. 3 shows a cam for converting the cutoff settings into terms of speed.

In the drawing I have not shown the interior mechanism of the indicator nor the connections thereof with the locomotive as such parts may be of standard make. The instrument includes mechanism suitably driven as for instance by a track wheel of the locomotive to indicate the speed of the locomotive on a dial and it also includes mechanism controlled by the reverse lever or the like to indicate the instant cutoff setting in terms of speed such for example as disclosed in the patent to Caracristi, No. 1,627,076, issued May 3, 1927, on the same dial which is graduated in miles per hour or any other unit of speed. The speed hand moves over the dial to indicate the instant speed of the locomotive and the cutoff hand is moved over the same dial under control of the cutoff gear in such ratio that when the two hands point to the same graduation it will indicate that the cutoff setting is set to give maximum tractive effort at the speed indicated by the speed hand.

The casing of the indicating instrument indicated at 10 carries a dial 11 which has suitable graduations thereon reading clockwise and indicating miles per hour. The speed hand 13 is mounted to swing over the dial and may be controlled by mechanism such as disclosed in said patent to indicate the instant speed of the locomotive. Mounted to turn on the same axis is the cutoff hand 14 which may be driven by mechanism such as disclosed in said patent to indicate the instant cutoff of the locomotive in terms of speed. A glass or other transparent cover 15 fits over the hands and dial. The cutoff hand 14 is mounted to pass under or back of the speed hand 13. The latter as disclosed in my Letters Patent of the United States #2,110,456, March 8, 1938, is provided at its outer end with a wing 16 extending in a counter-clockwise direction and bearing the word "Waste," and another wing 17 extending in the opposite direction, bearing the word "Economy." On the hand may be marked the word "Power."

In operation, when the locomotive is being brought up to speed and from that point of speed at which the locomotive should be hooked-up, that is, the point at which the cutoff should be first shortened, the engineer should endeavor to keep the cutoff hand alined with the speed hand by proper manipulation of the reversing lever. As long as the cutoff hand 14 lies directly under the speed hand, he knows that he is obtaining maximum tractive effort at that speed. Whenever the cutoff hand lags so that it passes under the wing marked "Waste," the engineer knows that he is wasting fuel. When the locomotive has got up to the desired speed, the engineer should shorten the cutoff by operating the reversing lever so that the cutoff hand will advance under the wing marked "Economy." The wings may be graduated as shown to give the extent of separation of the two hands. The length of the wing 17 serves to indicate for each speed the permissible range of settings shorter than that giving maximum tractive effort at that speed and the engineer should keep the cutoff hand within the span of the wing 17. However, since the wing has a fixed length it will be evident that when the speed hand climbs to a high figure such as say seventy miles an hour in the particular instrument illustrated, the wing 17 will extend too far, that is, it will indicate a permissible cutoff that is entirely too short for the particular locomotive.

We may assume that for such locomotive the cutoff limit would be 25% of the piston stroke and that this percentage is reached when the cutoff hand points to "80." I have provided an adjustable shield 20 in the form of a segment which in the assumed case would be set so as to cover a portion of the dial between "80" and "90." This will serve as a warning to the locomotive engineer that when working the locomotive and hooking up the engine he must not shorten the cutoff beyond a point where the cutoff hand 14 would move beyond the speed at which is set the rear or lower edge of the adjustable shield 20.

The adjustable shield 20 is provided with a hole receiving the speed hand shaft and is also provided with an arcuate right angularly positioned extension on which is formed a tongue 22 which operates in an elongated opening 23 in the indicator casing whereby the shield may be moved into different positions depending upon the characteristics of the particular locomotive upon which the instrument is used. For the purpose of holding the shield in adjusted position the casing of the indicator may be provided with a channel way 24 to slidably and non-rotatably receive a nut 25 on a tightening bolt 26 which passes through an arcuate slot 27 in said channel way and through an aperture in the extension 22 on the shield and is provided with a tightening nut 28 whereby the shield may be held in adjusted position.

In Fig. 3 I have disclosed a cam 30 which is controlled by the valve cutoff gear and cooperates with a roller 31 to control the position of the cutoff indicating hand 14 by a mechanism such as disclosed in said patent. The cam is shown in the position it occupies when the cutoff lever is in neutral position and the cutoff hand at its highest position. When the reverse lever is in the full forward position the cam will have been rotated through an arc such that the roller rests against the cam toward the opposite end permitting the cutoff hand 14 to be moved counterclockwise to its lowest position. In constructions heretofore used the lowest position in the case of the freight engine referred to would be at "8" miles per hour and in the case of the passenger engine referred to it would be "18" miles per hour. I propose to cut the large end of the cam as indicated at 30 so that, when the reverse lever is in the full forward position, the cutoff hand will point to the lowest position on the dial or at least to some indication on the dial which is less than the lowest indication at which the cutoff should be shortened.

When the locomotive is started the cutoff will be most retarded and the cutoff hand will be positioned at its lowest position. Heretofore the cutoff hand was positioned at a point where the cutoff should be shortened when the speed hand moved into alignment with the cutoff hand. According to my invention, I provide a shield 32 preferably in the form of a segment which also receives the shaft of the speed indicator and is adjustably mounted with respect to the dial of the indicator in the same manner in which the shield 20 heretofore described is mounted. This shield may be of a width to cover all positions from zero to the maximum position which should be covered or it may be made narrower if desired. It is made adjustable so that its forward edge may be brought into alignment with the speed indication on the dial at which the cutoff should first be shortened which may vary, say, from eight to eighteen miles, depending upon the type of locomotive and it is preferable to make the shield of a width at least equal to the distance between these points. The shields 20 and 32 are preferably mounted to cover the hands though they may be mounted between the hands and dial. As the speed hand and all of the speed indications on the dial should be visible, I may construct each shield of transparent material, which may be tinted or otherwise treated to make the shield or at least its indicating edge, visible. I may make the shields of non-transparent material and the segments of shorter diameter to expose the end of the speed hand and the speed indications. Instead of the shield 32 I may employ any other form of adjustable marker and in the broadest aspect of my invention I may use a fixed mark which may be placed on the dial or transparent cover.

My invention provides adjustable and settable means for indicating the speed at which the engineer should begin to hookup, which means is superior to the conventional means, the cutoff indicator hand, the full stroke position of which is not adjustable but may vary due to wear or breakage of its operating connections or the effect of temperature changes on such connections.

In starting the locomotive from a position of rest the cutoff lever is moved to full stroke position bringing the cutoff hand into its lowest position on the dial. The segment 32 has been adjusted to indicate the speed at which the cutoff should first be shortened. Assuming that the forward or higher edge of the shield 32 has been set at "18," the engineer will leave the reverse lever in the corner or full stroke position until the speed hand moves into alinement with the forward or higher edge of the shield at which time he will begin to hook-up, that is, to shorten the cutoff. From thereon the cutoff will be shortened to maintain the cutoff and speed hands substantially in alinement until the desired speed has been reached after which the cutoff should be shortened to save fuel. However at high speeds, when working the locomotive, the cutoff hand should not be advanced at any time beyond the rear or lower edge of the segment 20 for reasons described.

While I have disclosed specific means for carrying out my invention, it is to be understood that in its broader aspects the invention may be carried out by other means and that the means disclosed is to be taken merely as illustrative and not limitative and that I desire to cover all such modifications of my invention as fall within the scope of the appended claims.

I claim:

1. A speed and cutoff indicator for a locomotive, comprising a dial, a speed hand movable over the dial in response to variations of speed of the locomotive, a cutoff hand movable over the dial in response to variations in settings of the cutoff valve gear, the movements of the hands being so correlated for each speed that when the cutoff hand points to the same speed as the speed hand then the cutoff is set to give maximum tractive effort at that speed, and a shield covering the area of the dial in which the speed hand and the cut-off hand are positioned when starting the locomotive and in which the cutoff hand should remain until the speed hand advances from said area.

2. A speed and cutoff indicator for a locomotive, comprising a dial, a speed hand movable over the dial in response to variations of speed of the locomotive, a cutoff hand movable over the dial in response to variations in settings of the cutoff valve gear, the movements of the hands being so correlated for each speed that when the cutoff hand points to the same speed as the speed hand then the cutoff is set to give maximum tractive effort at that speed, and a shield covering the area of the dial in which the speed hand and the cutoff hand are positioned when the cutoff is set in its full stroke position to start the locomotive, and means for adjusting said shield to cover different areas of said dial depending upon the characteristics of the locomotive with which the indicator is used.

3. A speed and cutoff indicator for a locomotive, comprising a dial, a speed hand movable over the dial in response to variations of speed of the locomotive, a cutoff hand movable over the dial in response to variations in settings of the cutoff valve gear, the movements of the hands being so correlated for each speed that when the cutoff hand points to the same speed as the speed hand then the cutoff is set to give maximum tractive effort at that speed, and means cooperating with said dial to indicate the position of the speed hand at which the cutoff should be shortened from full stroke position in starting the locomotive.

4. A speed and cutoff indicator for a locomotive, comprising a dial, a speed hand movable over the dial in response to variations of speed of the locomotive, a cutoff hand movable over the dial in response to variations in settings of the cutoff valve gear, the movements of the hands being so correlated for each speed that when the cutoff hand points to the same speed as the speed hand then the cutoff is set to give maximum tractive effort at that speed, means cooperating with said dial to indicate the position of the speed hand at which the cutoff should be shortened from full stroke position in starting the locomotive, and means for adjusting said first mentioned means to indicate different positions at which the cutoff should be shortened depending upon the characteristics of the locomotive with which the indicator is used.

WILLIAM BELL WAIT.